United States Patent
Agiwal et al.

(10) Patent No.: US 10,757,750 B2
(45) Date of Patent: Aug. 25, 2020

(54) APPARATUS AND METHOD FOR MONITORING D2D TRANSMISSION IN CONNECTED STATE

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/877,738

(22) Filed: Jan. 23, 2018

(65) Prior Publication Data

US 2018/0152985 A1   May 31, 2018

Related U.S. Application Data

(63) Continuation of application No. 14/666,929, filed on Mar. 24, 2015, now Pat. No. 9,888,519.

(30) Foreign Application Priority Data

Mar. 24, 2014 (IN) .............................. 374/KOL/2014
Oct. 22, 2014 (IN) ............................. 1076/KOL/2014

(51) Int. Cl.
*H04W 4/00* (2018.01)
*H04W 76/28* (2018.01)
(Continued)

(52) U.S. Cl.
CPC ........... *H04W 76/28* (2018.02); *H04W 76/14* (2018.02); *H04W 76/19* (2018.02)

(58) Field of Classification Search
None
See application file for complete search history.

(56) References Cited

U.S. PATENT DOCUMENTS 9,763,274 B2  9/2017  Li et al.
2011/0237231 A1  9/2011  Horneman et al.
(Continued)

FOREIGN PATENT DOCUMENTS

| CN | 102204392 A | 9/2011 |
| WO | 2012/173568 A1 | 12/2012 |
| WO | 2013/019816 A2 | 2/2013 |

OTHER PUBLICATIONS

LG Electronics Inc.; RRC states for D2D communication and discovery; 3GPP TSG-RAN WG2 #83; R2-132491; Aug. 9, 2013; Barcelona, Spain.
(Continued)

*Primary Examiner* — Elisabeth Benoit Magloire
(74) *Attorney, Agent, or Firm* — Jefferson IP Law, LLP

(57) ABSTRACT

A method and an apparatus for monitoring device-to-device (D2D) transmission in a connected state in a communication system supportive of a D2D scheme are provided. The method includes monitoring, by a D2D user equipment (UE), a D2D transmission during a D2D resource cycle and a discontinuous reception (DRX) cycle in a radio resource control (RRC) state, transmitting an indication including a capability of the UE to a base station, and reestablishing an RRC connection from the base station, wherein the D2D resource cycle and the DRX cycle are configured not to overlap each other based on the indication.

20 Claims, 9 Drawing Sheets

(51) Int. Cl.
*H04W 76/14* (2018.01)
*H04W 76/19* (2018.01)

(56) References Cited

U.S. PATENT DOCUMENTS

| | | | |
|---|---|---|---|
| 2012/0263051 A1* | 10/2012 | Willars | H04W 76/20 370/252 |
| 2013/0012221 A1* | 1/2013 | Zou | H04W 72/10 455/452.1 |
| 2013/0273926 A1 | 10/2013 | Peng et al. | |
| 2013/0322413 A1* | 12/2013 | Pelletier | H04W 72/1289 370/336 |
| 2014/0056220 A1* | 2/2014 | Poitau | H04W 76/14 370/328 |
| 2014/0086152 A1 | 3/2014 | Bontu et al. | |
| 2014/0213306 A1 | 7/2014 | Blankenship et al. | |
| 2014/0241260 A1 | 8/2014 | Schmidt et al. | |
| 2014/0314057 A1 | 10/2014 | Van Phan et al. | |
| 2014/0328310 A1 | 11/2014 | Xu | |
| 2014/0342747 A1* | 11/2014 | Lee | H04L 5/0053 455/450 |
| 2015/0055532 A1 | 2/2015 | Lu et al. | |
| 2015/0085791 A1 | 3/2015 | Baghel | |
| 2015/0098414 A1 | 4/2015 | Kuo | |
| 2015/0208421 A1 | 7/2015 | Agiwal et al. | |
| 2015/0245192 A1 | 8/2015 | Wu et al. | |
| 2015/0289307 A1 | 10/2015 | Li et al. | |
| 2015/0296443 A1* | 10/2015 | Lim | H04W 48/12 370/312 |
| 2015/0312775 A1 | 10/2015 | Yi et al. | |
| 2015/0334756 A1 | 11/2015 | Lu et al. | |
| 2016/0007406 A1* | 1/2016 | Yi | H04W 52/0206 370/252 |
| 2016/0100401 A1 | 4/2016 | Xiong et al. | |
| 2016/0142898 A1* | 5/2016 | Poitau | H04W 76/14 370/329 |
| 2016/0198455 A1* | 7/2016 | Caretti | H04B 17/318 370/329 |
| 2016/0234670 A1 | 8/2016 | Zhang et al. | |
| 2016/0234702 A1 | 8/2016 | Heo et al. | |
| 2016/0278009 A1* | 9/2016 | Sorrentino | H04W 72/02 |
| 2016/0278121 A1 | 9/2016 | Agiwal et al. | |
| 2017/0034751 A1 | 2/2017 | Fujishiro et al. | |
| 2017/0230815 A1 | 8/2017 | Yasukawa et al. | |

OTHER PUBLICATIONS

ITRI; D2D Discovery Radio Resource Assignment based on RRC States; 3GPP TSG-RAN WG2 84; R2-134019; Nov. 1, 2013; San Francisco, CA.

Telecom Italia et al.; Design Principles for Network Control of D2D Transmission; 3GPP TSG-RAN WG2 #85; R2-140631; Feb. 1, 2014; Prague, Czech Republic.

3GPP; 3GPP TS 36.321 V12.1.0; 3rd Generation Partnership Project; Technical Specification Group Radio Access Network; Evolved Universal Terrestrial Radio Access (E-UTRA); Medium Access Control (MAC) protocol specification (Release 12); Mar. 20, 2014; France.

Chinese Office Action dated Mar. 26, 2019; Chinese Patent Application #: 201580027247.5.

* cited by examiner

APPARATUS AND METHOD FOR MONITORING D2D TRANSMISSION IN CONNECTED STATE

CROSS-REFERENCE TO RELATED APPLICATION(S)

This application is a continuation application of prior application Ser. No. 14/666,929, filed on Mar. 24, 2015, which will issue as U.S. Pat. No. 9,888,519 on Feb. 6, 2018 and was based on and claimed priority under 35 U.S.C. § 119(a) of an Indian patent application number 374/KOL/2014, filed on Mar. 24, 2014, in the Indian Patent Office, and of an Indian patent application number 1076/KOL/2014, filed on Oct. 22, 2014, in the Indian Patent Office, the disclosure of each of which is incorporated by reference herein in its entirety.

TECHNICAL FIELD

The present disclosure relates to an apparatus and method for monitoring device-to-device (D2D) transmission in a connected state in a communication system supportive of a D2D scheme.

BACKGROUND

Device-to-device (D2D) discovery is a process for determining whether a D2D-enabled user equipment (UE) is in proximity to another D2D-enabled UE. The discovering D2D-enabled UE determines, based on the D2D discovery process, whether the other D2D-enabled UE is interested in pairing with the discovering D2D-enabled UE. The other D2D-enabled UE is interested in the discovering D2D-enabled UE in case the proximity to the other D2D-enabled UE needs to be known by one or more certified applications in the discovering D2D-enabled UE.

As an example, a social networking application may be enabled to use a D2D discovery feature. The D2D discovery process enables the D2D-enabled UE of a given user of the social networking application to discover D2D-enabled UEs of friends of the given user and enables the D2D-enabled UE of the given user to be discovered by the D2D-enabled UEs of the friends of the given user. As another example, the D2D discovery process enables the D2D-enabled UE of a given user of a discovery application to discover nearby shops or restaurants of interest.

D2D communications in a frequency division duplex (FDD) system are performed on an uplink (UL) frequency. A dedicated signaling scheme between a D2D UE and a base station (BS) (or an evolved Node B (eNB)) is one method for allocating a resource(s) to the D2D UE for transmission. A D2D UE interested in transmission sends a request for a dedicated resource(s) to an eNB, and the eNB allocates a dedicated resource(s) for transmission to the D2D UE. The request and resource allocation are performed in a connected state where the UE and the eNB are connected with each other. The allocated resource(s) are semi-permanent in nature, and the UE maintains the connected state until the allocated resource(s) are consumed. A D2D UE transmitting D2D packets (discovery or data packets) may need to receive D2D packets (discovery or data packets) from other D2D UEs. In a connected state, a UE needs to continue monitoring downlink (DL) frequencies in order to receive, at least, a packet data common control channel (PDCCH) that is transmitted from an eNB. Accordingly, a D2D UE, upon intending to receive D2D packets on a UL frequency in a connected state, performs the following operations:
1. The D2D UE should not only transmit D2D packets on the UL frequency but receive D2D packets as well.
    a. This does not matter when the D2D UE is able to receive D2D packets through D2D resources unused for D2D transmission.
2. However, the D2D UE should transmit control data or data packets to the eNB on the UL frequency and receive D2D packets on the UL frequency.
    a. This is not a critical issue when D2D resources are separate from resources for communications with the eNB.
    b. In case D2D resources and resources for communications with the eNB are frequency division multiplexed in the same subframe, however, the D2D resources are monitored when the UE is not scheduled to communicate with the eNB.
    c. The UE should receive a PDCCH on a DL frequency and receive D2D packets on a UL frequency. No UE provides a capability that allows for simultaneous reception on both a DL frequency and a UL frequency.

Accordingly, this is important because the UE needs to monitor DL frequencies regarding PDCCHs even when there is no data scheduled on the UL or DL frequency.

The UE may be in a connected state for communications with the eNB or in a connection for allocating dedicated resources for D2D. The UE, once entering into a connected state, may remain in the connected state for a very long time due to a long period in discovery transmission and the feature of discovery transmission being periodically performed. In such case, the UE may fail to monitor D2D transmissions. Thus, a need exists for an apparatus and method for monitoring D2D transmission in a connected state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for monitoring device-to-device (D2D) transmission in a connected state in a communication system supportive of a D2D scheme.

In accordance with an aspect of the present disclosure, a method for monitoring D2D transmission in a connected state by a D2D user equipment is provided. The method includes monitoring, by the D2D user equipment (UE), a D2D transmission during a D2D resource cycle and a discontinuous reception (DRX) cycle in an radio resource control (RRC) state, transmitting an indication including a capability of the UE to a base station, and reestablishing an RRC connection from the base station, wherein the D2D resource cycle and the DRX cycle are configured not to overlap each other based on the indication.

In accordance with another aspect of the present disclosure, an apparatus for monitoring D2D transmission in a connected state in a D2D user equipment (UE) is provided. The apparatus includes a D2D monitoring module configured to monitor a D2D transmission during a D2D resource cycle and a DRX cycle in an RRC state, a transmitting unit configured to transmit an indication including a capability of the UE to a base station, and a controller configured to reestablish an RRC connection from the base station, wherein the D2D resource cycle and the DRX cycle are configured not to overlap each other based on the indication.

In accordance with another aspect of the present disclosure, a method for monitoring D2D transmission in a connected state by a base station is provided. The method includes receiving an indication including a capability of a UE from the UE while the UE monitors a D2D transmission during a D2D resource cycle and a DRX cycle in an RRC state, configuring the D2D resource cycle and the DRX cycle not to overlap each other based on the indication, and reestablishing an RRC connection with the UE.

In accordance with another aspect of the present disclosure, an apparatus for monitoring D2D transmission in a connected state in a base station is provided. The apparatus includes a receiving unit configured to receive an indication including a capability of a UE from the UE while the UE monitors a D2D transmission during a D2D resource cycle and a DRX cycle in an RRC state, and a controller configured to configure the D2D resource cycle and the DRX cycle not to overlap each other based on the indication and to reestablish an RRC connection with the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
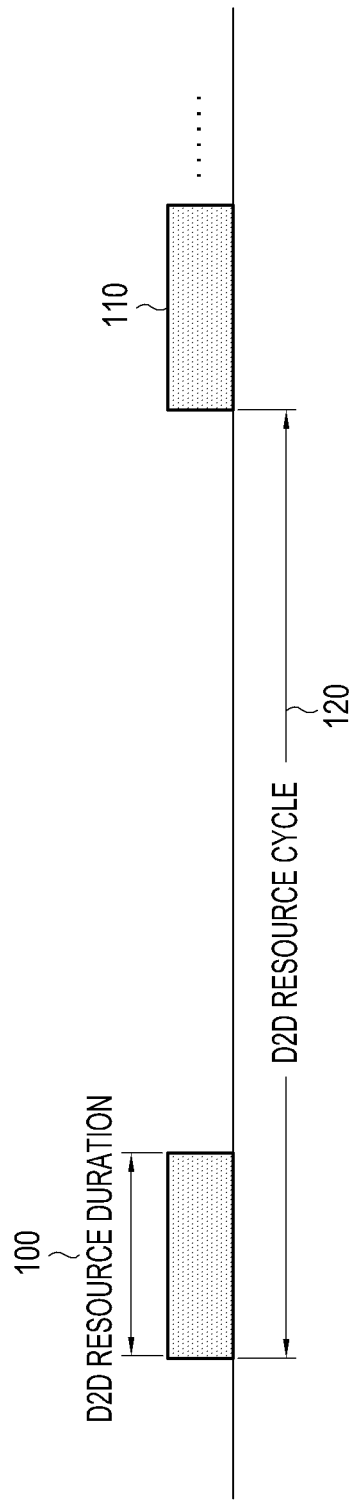
FIG. 1 is a view illustrating device-to-device (D2D) resources configured periodically according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein should be interpreted, rather than restrictively in their typical or dictionary definitions, in a way fitting the technical scope of the present disclosure based on the principle that the terms in the specification may be properly defined to best describe the present disclosure.

In the following description, it is assumed that wireless networks supporting direct communications between devices are device-to-device (D2D) networks. However, the technical configuration proposed herein should not be limited to D2D networks. In other words, it may be apparent to one of ordinary skill in the art that the technical configurations proposed herein may apply to cellular systems or wireless networks supportive of D2D direct communications. Particularly disclosed are operations of a transmitting user equipment (UE) over a wireless network upon driving of an application selected based on D2D communications with at least one receiving UE, according to an embodiment of the present disclosure. The transmitting UE transmits a discovery signal or discovery information to discover at least one receiving UE with which the transmitting UE is to form a D2D communication-based link. That is, this means a series of processes in which the transmitting UE informs its identity and interest to other nearby UEs. In this case, the identity and interest may be, e.g., an identifier (ID) of the UE, an application ID, or a service ID, and may be configured in various ways depending on D2D services or operation scenarios.

In the following description, it is assumed that, although not illustrated in the drawings, the layered structure of the D2D UE includes a D2D application layer, a D2D management layer, and a D2D transport layer. The D2D application layer means a D2D service application program driven in the UE's operating system (OS). The D2D management layer functions to convert the discovery information generated by the D2D application program into a format suitable for the transport layer. The transport layer means the physical medium access control (PHY/MAC) layer defined in the long term evolution (LTE) or Wi-Fi wireless communication standard. In this case, D2D discovery may be performed using the following procedure. If the user executes the D2D application program, the application layer generates information for discovery and transfers the generated information to the D2D management layer. The D2D management layer converts the discovery information received from the D2D application layer into a management layer message. The management layer message is transmitted through the transport layer of the UE. When receiving the management layer message, UEs conduct a receiving operation in reverse order of the transmitting process.

Meanwhile, D2D communication refers to a communication scheme in which traffic is transferred between UEs directly. That is, traffic is transferred directly between UEs without passing through an infrastructure such as a base station or access point (AP). In this case, D2D communications may be performed based on a result of the D2D discovery process (i.e., with discovered UEs), or may be done without performing the D2D discovery process. Whether a D2D discovery process needs to be performed before a D2D communication is conducted may vary depending on D2D services or operation scenarios.

D2D service scenarios may be generally classified into commercial services (e.g., non-public safety services) and public safety services related to public safety. There may be a myriad number of examples as follows, among which representative examples include advertisement, social network services (SNSs), games, public safety services, etc.

1) Advertisement: the operator of a D2D-supportive communication network may allow a pre-registered shop, cafe, movie theater, or restaurant to advertise its identity to nearby D2D users using D2D discovery or D2D communications. In this case, interests may include promotion or event information or discount coupons offered by the advertisers. Among the D2D users, the ones interested in discounting or issuing a coupon on a particular product upload their interests on a D2D server. In case the identity received by the D2D users matches the users' interests, the users may visit a corresponding shop to obtain more information using an existing cellular communication network or D2D communications. As another example, an individual user may discover a nearby taxi through D2D discovery and communicate the information on his destination or fare through existing cellular communications or D2D communications.

2) SNS: A user may transmit his application and an interest on the application to other users positioned in a nearby area. In this case, the identity or interests used in D2D discovery may include a friend list in the application or an application identifier. After D2D discovery, the user may share his contents such as pictures or videos with the nearby users through D2D communications.

3) Game: A user may discover other users and a game application through a D2D discovery process in order to enjoy a mobile game with nearby users, and the user may perform a D2D communication for transmission of data necessary for the game.

4) Public safety service: Police and fire fighters may use D2D communication technology for the purposes of public safety. In other words, in case existing cellular networks are partially damaged by an emergency, such as a fire, a landslide, an earthquake, a volcanic outburst, a tsunami, or other disaster, police and fire fighters may discover their nearby colleagues or share information on the emergency with nearby users through a D2D communication technique.

A D2D UE described below may include one of a transmitting UE and a receiving UE. Among others, the terms "cellular mode device" and "D2D UE" as used herein may be described as distinct from each other. "Cellular mode device" denotes a UE that communicates with a base station or another UE via a cellular communication network without a D2D direct link according to the related art, and "D2D UE" denotes a UE that conducts D2D discovery or D2D direct communications via a D2D direct link. In this case, a D2D UE may communicate with a base station to communicate various pieces of control information. As used herein, the term "UE," unless otherwise stated, may denote a cellular mode UE as well as a D2D UE.

Now described is a method for monitoring D2D transmission in a connected state according to an embodiment of the present disclosure.

In an embodiment of the present disclosure, the D2D UE is in the connected state, and the D2D UE does not have the capability for simultaneous reception on both a downlink (DL) frequency and an uplink (UL) frequency. Upon desiring to receive D2D packets (e.g., discovery or data packets) transmitted from other D2D UEs, the D2D UE and an evolved Node B (eNB) operate as follows.

1. The UE monitors the UL frequency only when the UE switches to a discontinuous reception (DRX) substate of a connected mode.
2. The eNB configures a DRX ON period duration and D2D resources (e.g., a D2D resource cycle and D2D resources in the D2D resource cycle) so that they do not overlap each other.

According to an embodiment of the present disclosure, even with the capability for simultaneous reception on both the DL and UL frequency, the D2D UE may perform the above operation in order to reduce power consumption.

Monitoring UL Frequency by UE while in Connected Mode DRX Substate

The UE monitors the UL frequency only when the UE switches to a connected mode DRX substate. In the connected mode DRX substate, the UE periodically monitors the DL frequency for a short duration. When the UE is in the connected mode DRX substate, the D2D UE monitors the UL frequency during a DRX OFF period, i.e., when the UE does not monitor the DL frequency.

1. A connected mode DRX module of the UE, upon stopping the DL frequency monitoring, may transmit an indication to a D2D monitoring module.
   a. The D2D monitoring module may be configured with a parameter that indicates the subframe where the connected mode DRX module starts DL frequency monitoring. For example, the parameter may be longDRX-CycleStartOffset sf1280, and a value of the parameter may be, e.g., 511. A system frame number (SFN) at which the connected mode DRX module starts DL frequency monitoring and a subframe number (sub FN) meet the following equation: (SFN*10+sub FN) mod 1280=511.
   Accordingly, after receiving the indication from the connected mode DRX module, the D2D monitoring module may be aware of a time when the connected mode DRX module resumes the DL frequency monitoring.

b. In another approach, the connected mode DRX module in the UE may inform the D2D monitoring module of the subframe (e.g., SFN, sub FN) where the connected mode DRX module resumes the DL frequency monitoring.

c. In still another approach, the connected mode DRX module in the UE may transmit, to the D2D monitoring module, an indication with information on a period when the DL frequency is not monitored (e.g., the start and end of the subframe).

2. In the DRX periods indicated by the connected mode DRX module, the UE monitors subframes where D2D resources are configured. During the D2D monitoring, the UE monitors subframes that the UE need not send to the eNB. D2D resources are configured by a radio resource control (RRC).

Non-Overlapping DRX ON Period Durations and Configuring D2D Resources by eNB

FIG. 1 is a view illustrating D2D resources configured periodically according to an embodiment of the present disclosure.

Referring to FIG. 1, D2D resources 100 and 110 are periodically configured. As illustrated in FIG. 1, the D2D resources are periodically configured for small durations, i.e., D2D resource durations 100, within, e.g., a D2D resource cycle 120.

Figure 2:
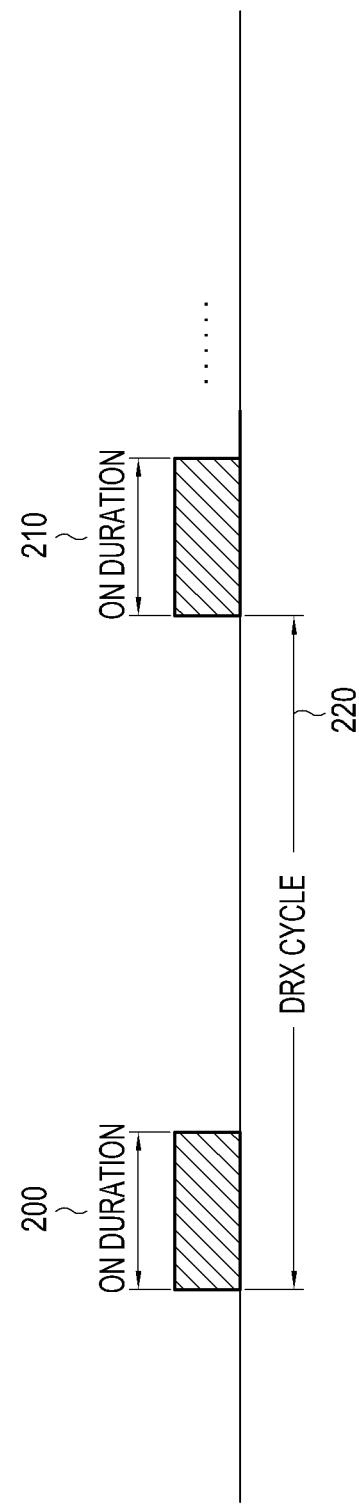
FIG. 2 is a view illustrating a connected mode discontinuous reception (DRX) cycle according to an embodiment of the present disclosure.

FIG. 2 is a view illustrating a connected mode DRX cycle according to an embodiment of the present disclosure.

Referring to FIG. 2, the DL frequency is periodically monitored for small durations, i.e., ON durations 200 and 210, within the DRX cycle. According to an embodiment of the present disclosure, the D2D resource cycle and the connected mode DRX cycle are configured so that the ON duration 200 of the connected mode DRX cycle 220 does not overlap the D2D resource duration 100.

As an example, the non-overlapping between the ON duration 200 of the connected mode DRX cycle and the D2D resource duration 100 on the D2D resource cycle may be guaranteed as follows: The DRX 220 may be defined based on parameters, such as DRXCycleDuration, DRXCycleOntime, and DRXOffset. Here, a frame number where a DRX cycle starts may be defined as in the following Equation 1.

SFN mod DRXCycleDuration=DRXOffset     Equation 1

The UE monitors DL from SFN to SFN+DRXCycleOntime. A D2D resource cycle may be defined based on parameters, such as D2DCycleDuration, D2DResourceDuration, and data rate control (DRC) Offset. Here, a frame number where a D2D resource cycle starts may be defined as in the following Equation 2.

SFN mod D2DCycleDuration=DRXOffset     Equation 2

D2D resources are present from SFN to SFN+D2DResourceDuration.

a) In case D2DCycleDuration=N*DRXCycleDuration (N=1, 2, 3, . . . ); or N*D2DCycleDuration=DRXCycleDuration (N=1, 2, 3, . . . ; b) DRXOffset=DRCOffset+D2DResourceDuration or DRCOffset=DRXOffset+DRXCycleOntime, the non-overlapping between the ON duration 200 on the connected mode DRX cycle and the D2D resource duration 100 on the D2D resource cycle may be guaranteed. The non-overlapping between the ON duration 200 on the connected mode DRX cycle and the D2D resource duration 100 on the D2D resource cycle is illustrated in FIG. 3.

Figure 3:
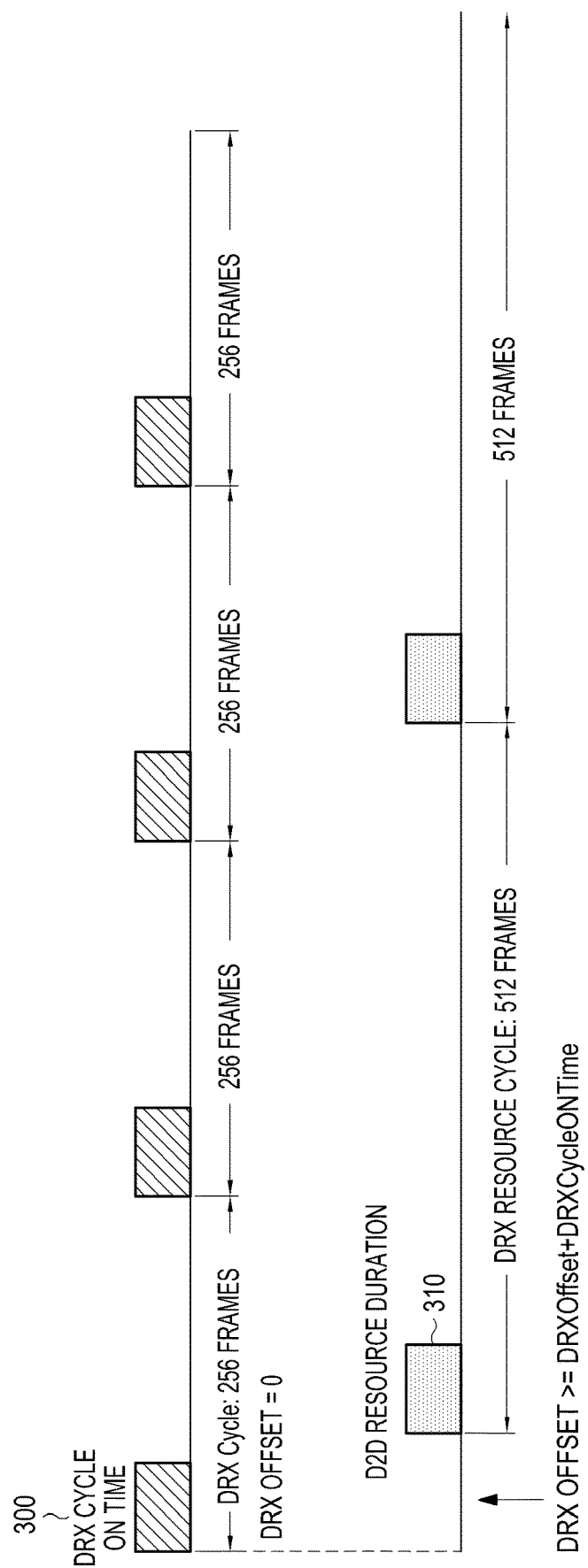
FIG. 3 is a view illustrating an example in which a connected mode DRX cycle and a D2D resource cycle do not overlap according to an embodiment of the present disclosure.

FIG. 3 is a view illustrating an example in which a connected mode DRX cycle and a D2D resource cycle do not overlap according to an embodiment of the present disclosure.

Referring to FIG. 3, the network or the eNB configures a connected mode DRX cycle in the UE without considering D2D resources (e.g., a D2D resource cycle and D2D resources in the D2D resource cycle). The network or eNB may vary the connected mode DRX cycle already configured in the UE, or even when no connected mode DRX cycle is configured in the UE, may configure a connected mode DRX cycle considering the D2D resources so that ON duration times 300 do not overlap the D2D resources 310.

Figure 4:
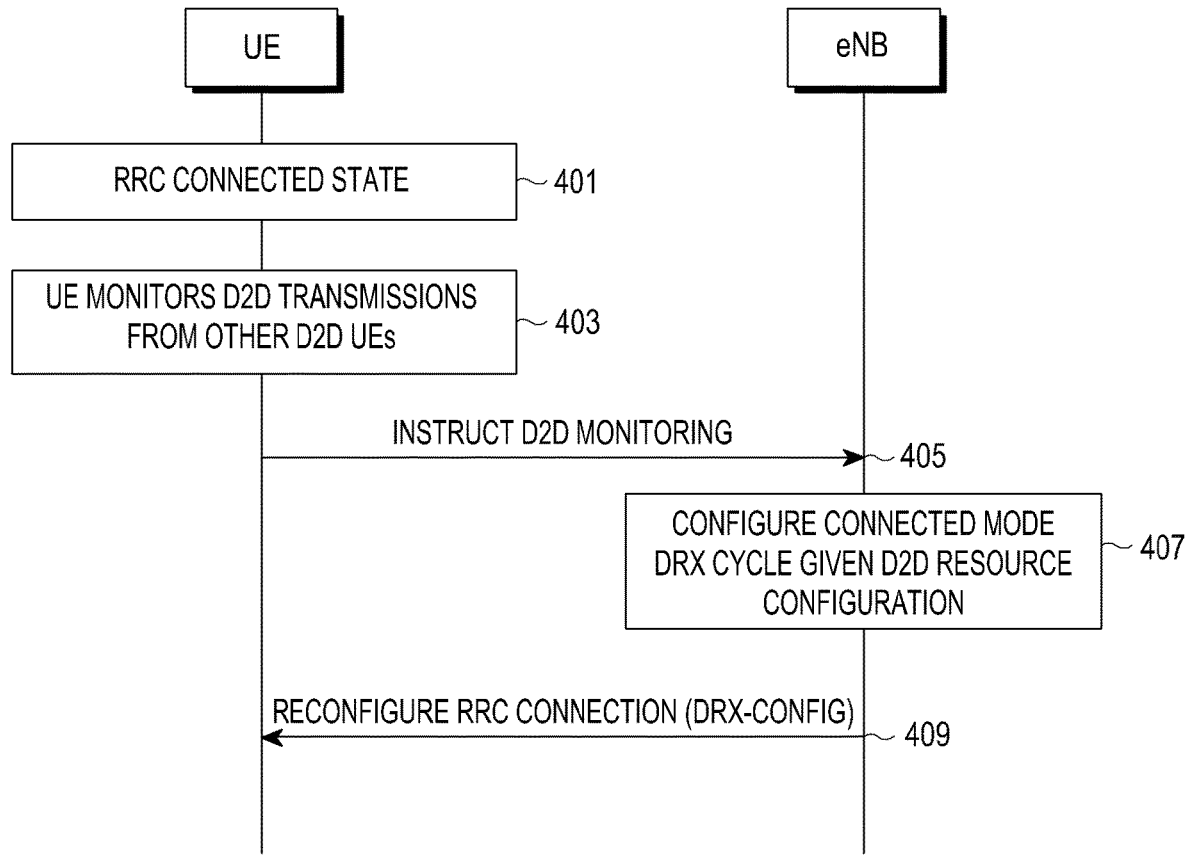
FIG. 4 is a flowchart illustrating a method for monitoring D2D transmission in a connected state according to an embodiment of the present disclosure.

FIG. 4 is a flowchart illustrating a method for monitoring D2D transmission in a connected state according to an embodiment of the present disclosure.

Referring to FIG. 4, the network or eNB, upon informing that the D2D UE is monitoring the D2D transmissions from other UEs in the connected state, configures a connected mode DRX cycle considering D2D resources (for example, a D2D resource cycle and D2D resources in the D2D resource cycle).

The D2D UE stays in an RRC connected state at operation 401. The D2D UE monitors D2D transmissions from other D2D UE(s) at operation 403. The D2D UE instructs the network or eNB to conduct D2D monitoring at operation 405. The network or eNB then configures a connected mode DRX cycle considering to a given D2D resource configuration at operation 407. The network or eNB reestablishes an RRC connection in the D2D UE at operation 409.

Figure 5:
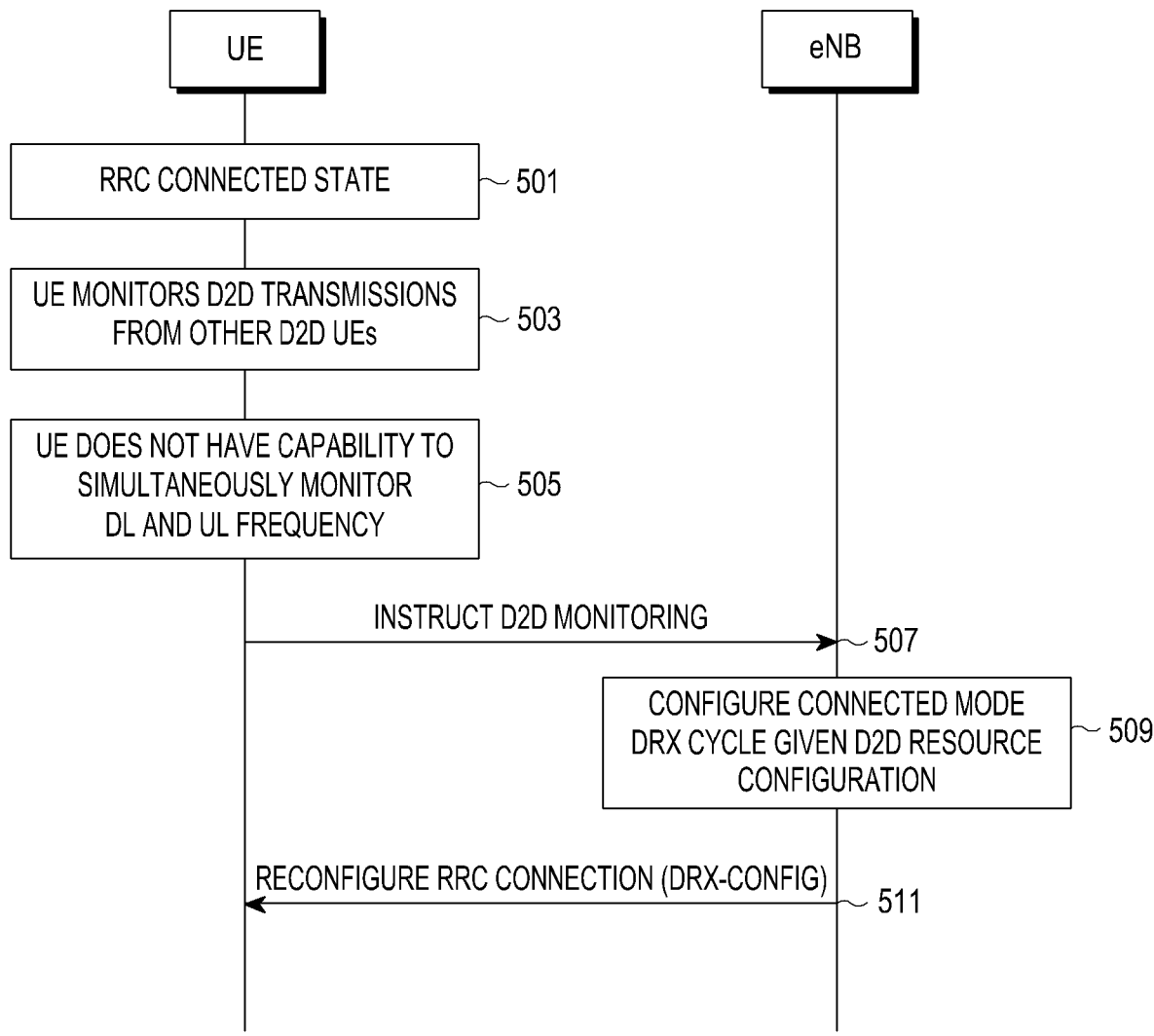
FIG. 5 is a flowchart illustrating a method for monitoring D2D transmission in a connected state according to an embodiment of the present disclosure.

FIG. 5 is a flowchart illustrating a method for monitoring D2D transmission in a connected state according to an embodiment of the present disclosure.

Referring to FIG. 5, the D2D UE stays in an RRC connected state at operation 501. The D2D UE monitors D2D transmissions from other D2D UE(s) at operation 503. When not able to simultaneously monitor the DL and UL frequency, the D2D UE informs that the D2D UE is monitoring D2D transmissions from other UEs at operation 505. The D2D UE instructs the network or eNB to conduct D2D monitoring at operation 507. The network or eNB then configures a connected mode DRX cycle based on a given D2D resource configuration at operation 509. The network or eNB reestablishes an RRC connection in the D2D UE at operation 511.

Figure 6:
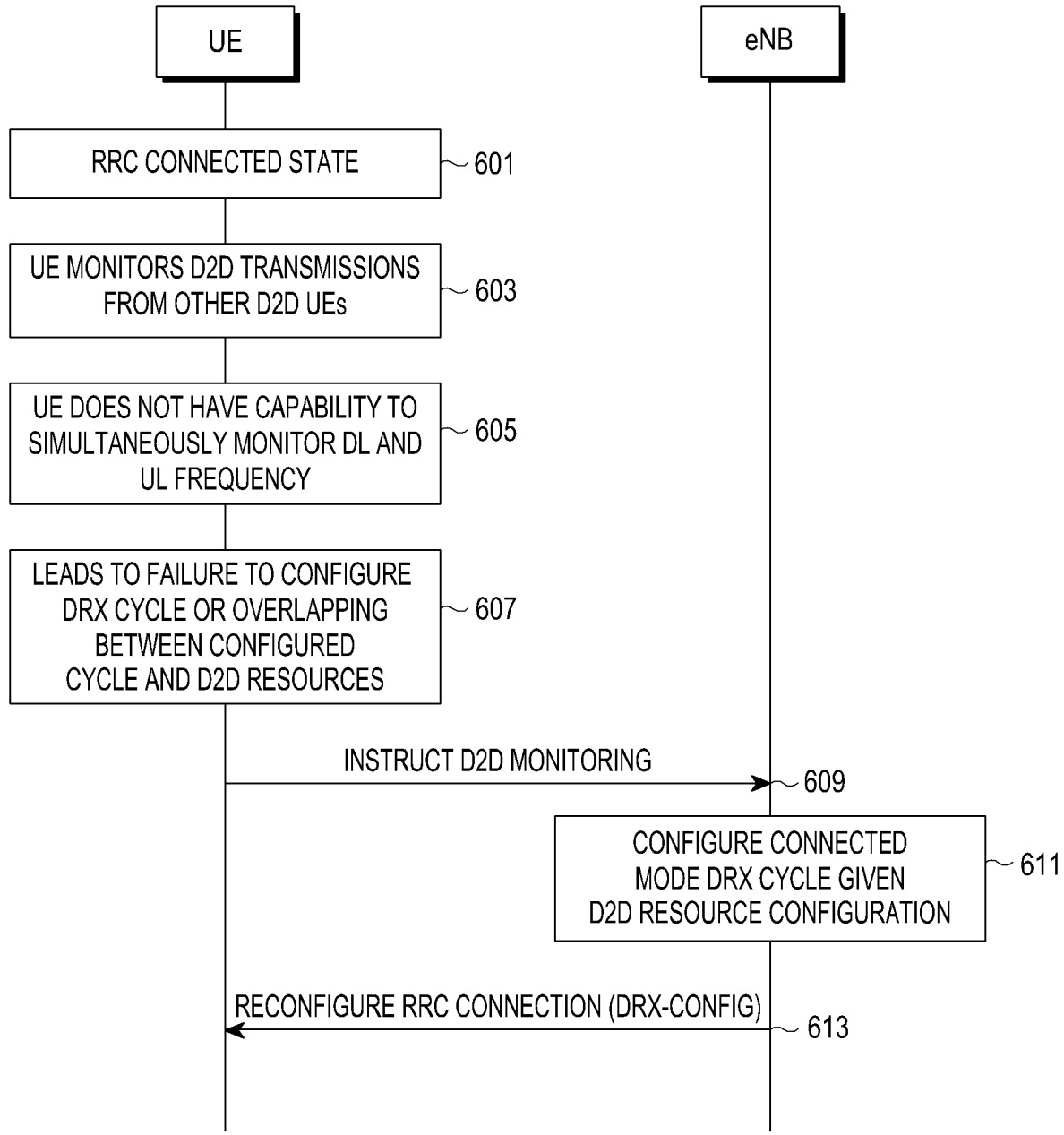
FIG. 6 is a flowchart illustrating a method for monitoring D2D transmission in a connected state according to an embodiment of the present disclosure.

FIG. 6 is a flowchart illustrating a method for monitoring D2D transmission in a connected state according to an embodiment of the present disclosure.

Referring to FIG. 6, the D2D UE stays in an RRC connected state at operation 601. The D2D UE monitors D2D transmissions from other D2D UE(s) at operation 603. When not able to simultaneously monitor the DL and UL frequency, the D2D UE informs that the D2D UE is monitoring D2D transmissions from other UEs at operation 605 and that the currently configured DRX cycle lead to overlap between ON duration time and D2D resources at operation 607.

The D2D UE instructs the network or eNB to conduct D2D monitoring at operation 609. The network or eNB then configures a connected mode DRX cycle based on a given D2D resource configuration at operation 611. The network or eNB reestablishes an RRC connection in the D2D UE at operation 613.

Figure 7:
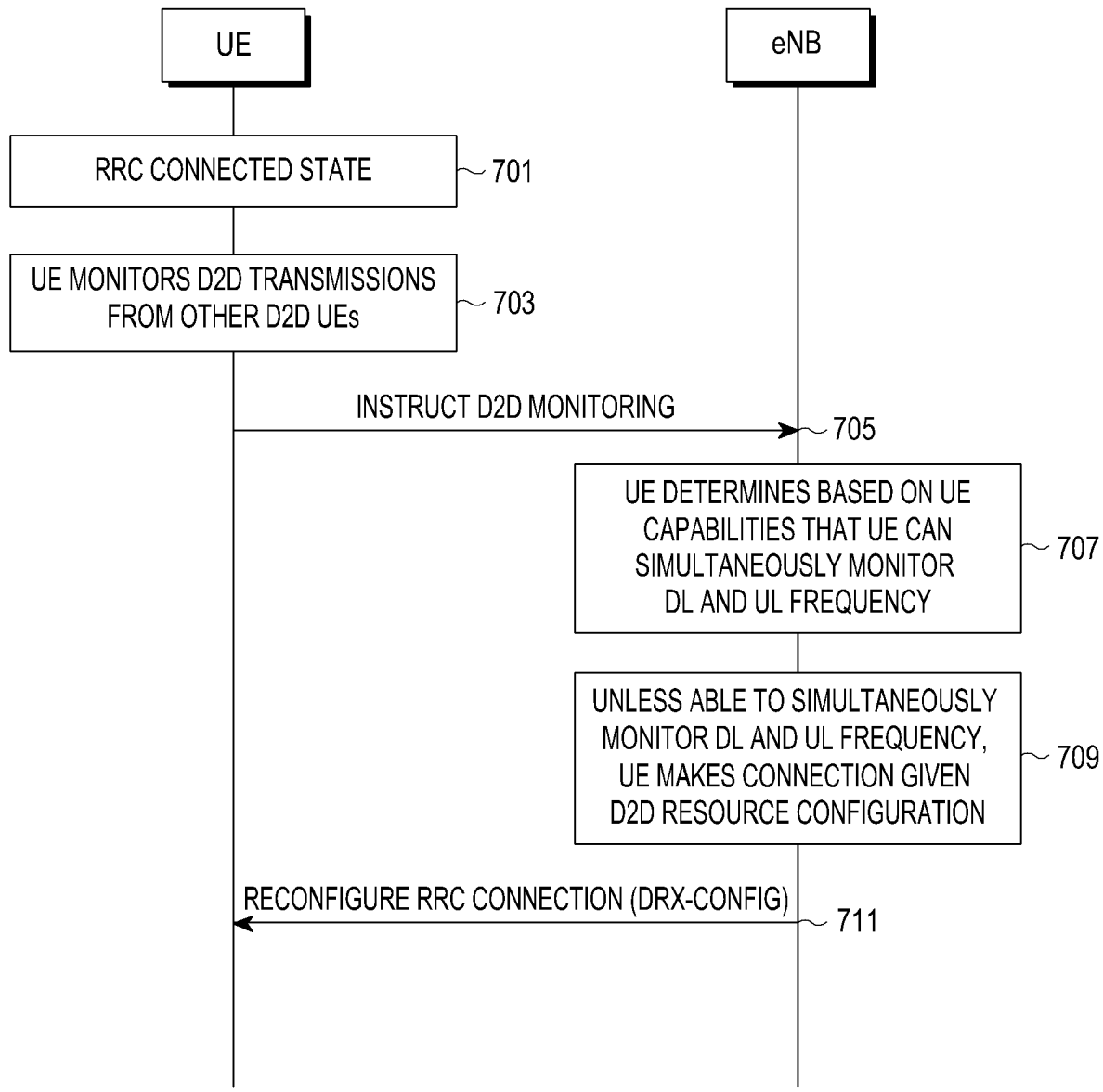
FIG. 7 is a flowchart illustrating a method for monitoring D2D transmission in a connected state according to an embodiment of the present disclosure.

FIG. 7 is a flowchart illustrating a method for monitoring D2D transmission in a connected state according to an embodiment of the present disclosure.

Referring to FIG. 7, the D2D UE stays in an RRC connected state at operation 701. The D2D UE monitors D2D transmissions from other D2D UE(s) at operation 703.

The D2D UE instructs the network or eNB to conduct D2D monitoring at operation 705. In this case, the capability of simultaneously monitoring the DL and UL frequency or not may be indicated to the network or eNB as part of the UE's capabilities.

The network or eNB determines, based on the UE's capabilities, whether the UE may simultaneously monitor the DL and UL frequency at operation 707. In case the UE cannot perform simultaneous monitoring of the DL and UL frequency, the network or eNB configures a connected mode DRX cycle based on a given D2D resource configuration at operation 709.

The network or eNB reestablishes an RRC connection in the D2D UE at operation 711.

In other words, according to an embodiment of the present disclosure, the capability of simultaneously monitoring the DL and UL frequency may or not may be indicated to the eNB as part of the UE's capabilities. Upon receiving information indicating that the UE monitors the discovery messages from the UE and the UE's capability to simultaneously monitor discovery transmissions from D2D UEs and DL, the network or eNB may configure a DRX cycle as described supra.

In an embodiment of the present disclosure, the network or eNB may configure a connected mode DRX cycle considering the D2D resources (e.g., a D2D resource cycle and D2D resources in the D2D resource cycle) configured in the RRC connected D2D UEs. The network or eNB may determine that the UE is not based on the UE's S1 context received from a mobility management entity during D2D or connection configuration.

In an embodiment of the present disclosure, the network or eNB may configure a connected mode DRX cycle considering the D2D resources (e.g., a D2D resource cycle and D2D resources in the D2D resource cycle) configured in the RRC connected UEs.

In contrast, if dedicated discovery resources have been allocated to the D2D UEs, the network may configure a connected mode DRX cycle considering the D2D resources (e.g., a D2D resource cycle and D2D resources in the D2D resource cycle) configured in the RRC connected D2D UEs.

Figure 8:
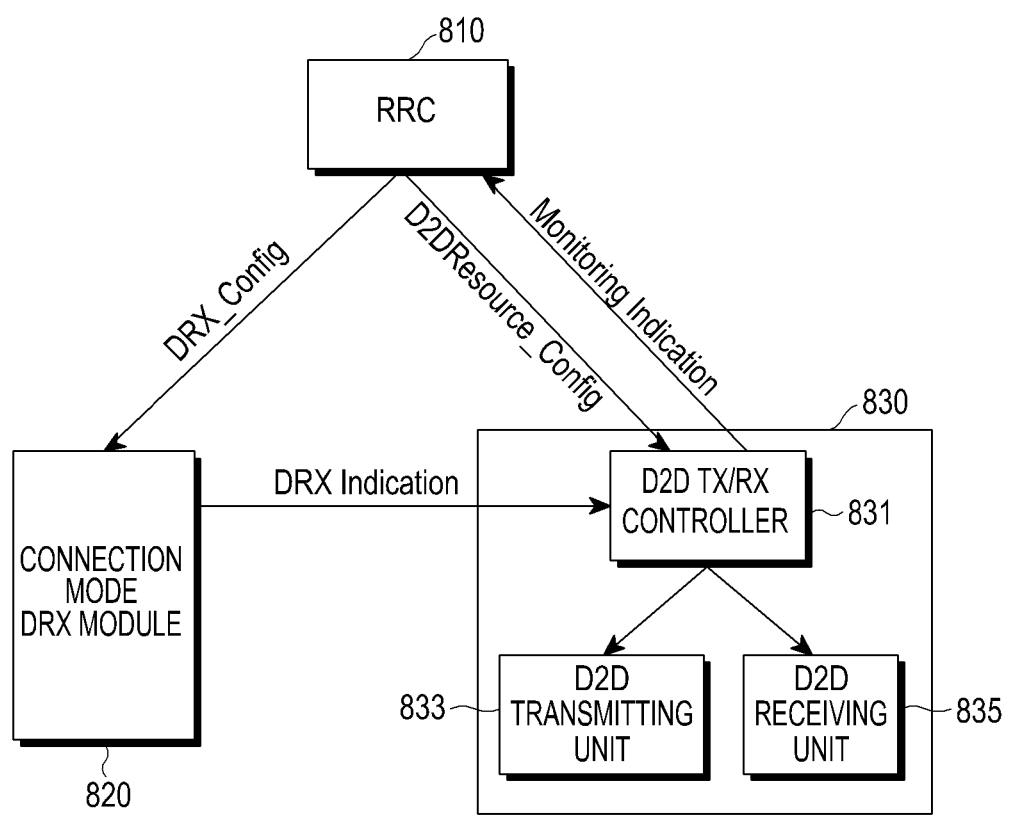
FIG. 8 is a block diagram illustrating a configuration of a user equipment (UE) according to an embodiment of the present disclosure.

FIG. 8 is a block diagram illustrating a configuration of a UE according to an embodiment of the present disclosure.

Referring to FIG. 8, the UE includes a connected mode DRX module 820, an RRC 810, and a D2D monitoring module 830.

The RRC 810 configures the UE in an RRC state, and, in the RRC state, transmits a DRX configuration to the connected mode DRX module 820.

The connected mode DRX module 820 performs DRX during a D2D resource cycle and a DRX cycle.

The D2D monitoring module 830 includes a D2D transmitter (TX)/receiver (RX) controller 831, a D2D transmitting unit 833, and a D2D receiving unit 835.

The D2D TX/RX controller 831 monitors transmissions from other D2D UEs in RRC connected mode. The D2D TX/RX controller 831 may be configured with a parameter that indicates the subframe where the connected mode DRX module 820 starts DL frequency monitoring.

After receiving the indication from the connected mode DRX module 820, the D2D TX/RX controller 831 may be aware of a time when the connected mode DRX module 820 resumes the DL frequency monitoring.

Upon stopping the DL frequency monitoring, the D2D TX/RX controller 831 transmits an indication requesting to stop monitoring to the D2D monitoring module 830.

Upon requesting frequency monitoring, the D2D transmitting unit 833 transmits an indication requesting monitoring to the RRC 810.

The D2D receiving unit 835 receives the DRX indication from the connected mode DRX module 820. The D2D receiving unit 835 receives a D2D resource configuration (D2Dresource_Config) from the RRC 810.

The connected mode DRX module 820 is also present in UE which do not support the D2D feature. But, the D2D monitoring module 830 is present only in D2D UE.

The configuration of the UE illustrated in FIG. 8 may apply likewise to a base station according to an embodiment of the present disclosure.

Figure 9:
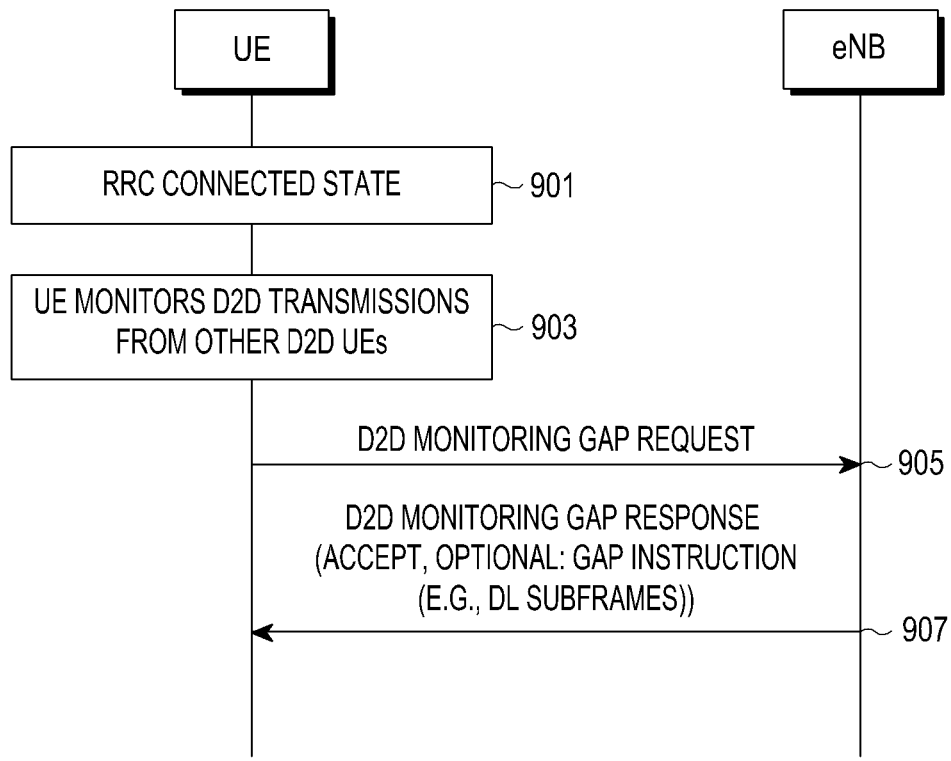
FIG. 9 is a flowchart illustrating a method for monitoring D2D transmission in a connected state according to an embodiment of the present disclosure.

FIG. 9 is a flowchart illustrating a method for monitoring D2D transmission in a connected state according to an embodiment of the present disclosure.

Referring to FIG. 9, a D2D UE stays in an RRC connected mode state at operation 901 and may monitor transmissions from other D2D UEs at operation 903.

The D2D UE transmits a monitoring request to an eNB at operation 905. Upon reception of the monitoring request, the eNB does not send transmissions in the DL subframes corresponding to the UL subframes with D2D resources, and the UEs transmit, to the UE, responses indicating that they may monitor D2D in the subframes where D2D resources are configured at operation 907. The UL subframes with D2D resources are previously known by broadcast information transmitted from the eNB. The eNB does not send any transmission to the UE in order to avoid the UE from monitoring the DL frequency while monitoring the D2D resources in the DL subframes corresponding to the UL subframes with D2D resources. The eNB may schedule nothing in the UL subframes with D2D resources. In an embodiment of the present disclosure, the response may indicate particular subframes (serving cell and/or neighboring cell has D2D resources) where the UE may conduct monitoring on D2D. The eNB may send a response to reject the request. The eNB may reject to prioritize communications with the eNB. Upon receiving a response accepting the request from the D2D UE, the D2D UE performs the following operations.

The D2D UE might not monitor the DL subframes corresponding to the UL subframes with D2D resources.

The D2D UE does not send transmissions to the eNB on the UL subframes with D2D resources. The UE, if supposed to transmit D2D packets through the UL subframes with D2D resources, may transmit D2D packets. The UE would monitor the UL subframes with D2D resources where no D2D packets are transmitted to the other UEs.

Or, the UE would monitor UL subframes with D2D resources where no D2D packets are transmitted to the other UEs or no data or control packets are transmitted to the eNB.

In an embodiment of the present disclosure, when informing that the D2D UE is monitoring D2D transmissions from the other UEs in the connected state, the network or eNB transmits a response indicating that the UE may perform the monitoring through subframes where D2D resources are configured. The response may indicate particular subframes (serving cell and/or neighboring cell has discovery resources) where the UE may conduct monitoring on D2D.

Figure 10:
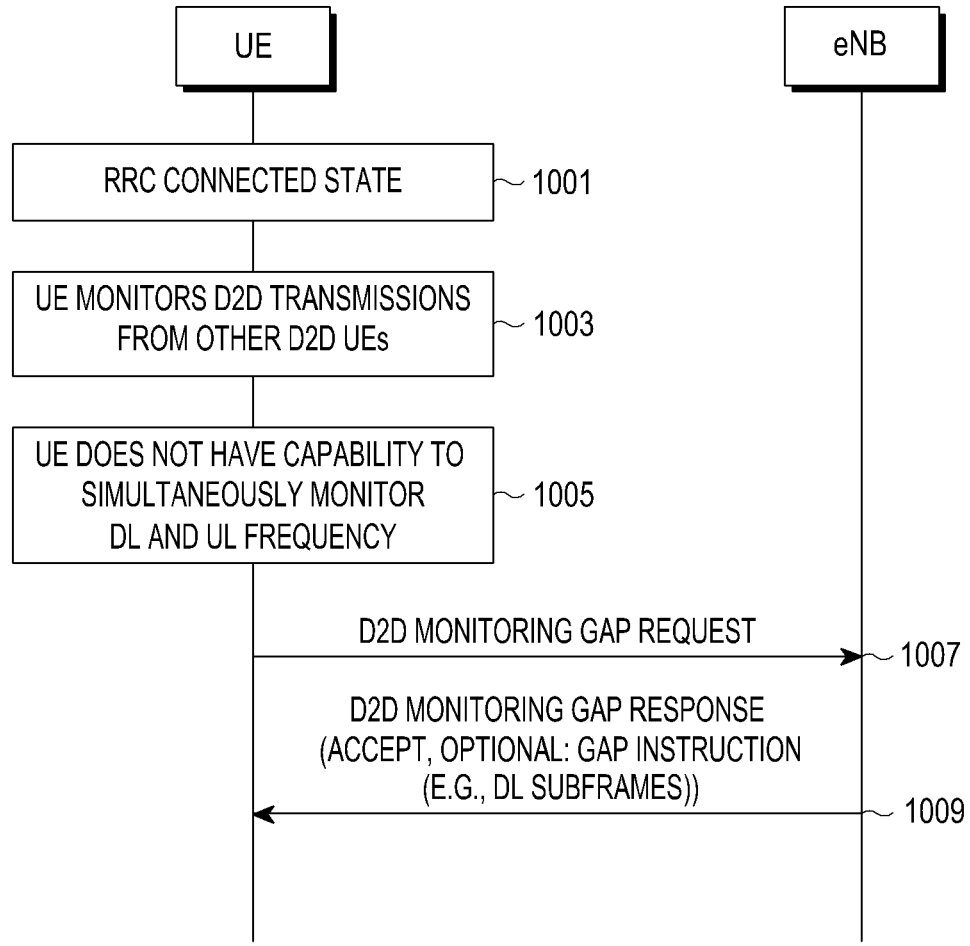
FIG. 10 is a flowchart illustrating a method for monitoring D2D transmission in a connected state according to an embodiment of the present disclosure.

FIG. 10 is a flowchart illustrating a method for monitoring D2D transmission in a connected state according to an embodiment of the present disclosure.

Referring to FIG. 10, a D2D UE stays in an RRC connected state at operation 1001 and may monitor transmissions from other D2D UEs at operation 1003.

The D2D UE, unless capable of simultaneously monitoring the DL and UL frequency at operation 1005, informs that the D2D UE is monitoring D2D transmissions from other UEs at operation 1007.

In another approach, the capability of simultaneously monitoring the DL and UL frequency or not may be indicated to the eNB as part of the UE's capabilities. Upon receiving the information indicating that the D2D messages are monitored from the UE, the eNB may check the UE's capability to simultaneously monitor the DL and D2D transmissions from the D2D UEs and may accordingly transmit a response at operation 1009.

If the UE's request is rejected, the eNB may configure a DRX cycle so that the UE, while not monitoring the DL (i.e., during DRX), may monitor the D2D resources as in approach 1.

In an embodiment of the present disclosure, the UE, upon start of D2D monitoring, may transmit a monitoring indication to the eNB. Upon receiving the monitoring indication, the eNB determines whether the UE has the capability to simultaneously monitor DL and UL.

In case the UE has the capability to simultaneously monitor DL and UL, the eNB might not schedule UL transmissions to the eNB through the UL subframes with D2D resources whenever possible, according to the Quality of Service (QoS) of the UE for transmissions from the eNB. The UE monitors UL subframes with D2D resources that are not scheduled for UL transmission to the eNB.

When the UE has no capability to simultaneously monitor DL and UL, the eNB performs the following operations.

The eNB informs the UE (by transmitting a dedicated message or broadcasting system information) that the eNB would transmit nothing through the DL subframes corresponding to the UL subframes with D2D resources, or the eNB indicates particular DL subframes where nothing would be transmitted. In the third embodiment of the present disclosure, the above rule to stop the eNB from transmitting anything through the DL subframes corresponding to the UL subframes with D2D resources may be previously specified. The eNB may schedule nothing for the UL subframes with D2D resources whenever possible, according to the QoS of the UE for transmissions from the eNB. The UE might not monitor the DL subframes corresponding to the UL subframes with D2D resources. In an embodiment of the present disclosure, the UE might not monitor the DL subframes coming ahead or subsequent to the UL subframes with discovery resources. The UE would monitor UL subframes with D2D resources where no D2D packets are transmitted to the other UEs or no data or control packets are transmitted to the eNB.

The eNB may configure a DRX cycle so that the UE, while not monitoring the DL (i.e., during DRX), may monitor the D2D resources as in the first embodiment of the present disclosure. By way of example, this is carried out when the eNB cannot pause transmission to the DL due to the QoS of the ongoing UE-eNB communication.

When a monitoring indication is sent along with the UE's capability to simultaneously monitor DL and UL or separately from the UE's capability, the eNB may appreciate the capability as part of a UE context from the mobile management entity (MIME). When D2D monitoring is related with discovery, the UE may inform one of the following:

1. The UE may inform whether discovery on UL and wide area network (WAN) on DL may be received in parallel.
2. The UE may inform whether discovery on UL and WAN on DL may be received in parallel. One of the following may be informed as well:
   a. Whether discovery RX uses a DL RX chain.
   b. Whether discovery RX uses a dedicated RX chain.
   c. Whether there is any influence on DL carrier aggregation (CA) capability.

The eNB would interpret that the UE cannot receive discovery on UL and WAN on DL under the following circumstances:

a. When the UE informs that the UE cannot receive discovery on UL and WAN on DL in parallel.
   b. When the UE informs that the UE can receive discovery on UL and WAN on DL, DL CA is configured through the maximum DL CA capability, and the UE indicates one of the following:
      i. Discovery RX uses a DL RX chain.
      ii. Discovery RX does not use a dedicated RX chain.
      iii. Influence on DL CA capability.
3. The UE may inform whether the UE has a dedicated RX chain for discovery RX. When there is no dedicated RX chain, the eNB would interpret that the UE cannot receive discovery on UL and WAN on DL.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for device-to-device (D2D) communication by a D2D user equipment (UE), the method comprising:
   transmitting an indication of interest to D2D monitoring of the D2D UE;
   receiving, from the base station, a discontinuous reception (DRX) configuration; and
   monitoring D2D transmission from another UE based on the DRX configuration,
   wherein the D2D transmission is monitored by using a DRX cycle or a receiver (Rx) chain.

2. The method of claim 1,
   wherein the D2D transmission is monitored using a resource obtained based on the DRX configuration.

3. The method of claim 1,
   wherein the D2D transmission is monitored by monitoring a discovery message.

4. The method of claim 3,
   wherein the Rx chain is at least available for intra-frequency discovery.

5. The method of claim 1,
   wherein a reception gap for D2D discovery is not configured by the base station.

6. A device-to-device (D2D) user equipment (UE) comprising:
 a transceiver; and
 a processor configured to:
  control the transceiver to transmit, to a base station, an indication interest to D2D monitoring of the D2D UE,
  control the transceiver to receive, from the base station, a discontinuous reception (DRX) configuration, and
  monitor D2D transmission from another UE based on the DRX configuration,
 wherein the D2D transmission is monitored by using a DRX cycle or a receiver (Rx) chain.

7. The D2D UE of claim 6,
 wherein the D2D transmission is monitored using a resource obtained based on the DRX configuration.

8. The D2D UE of claim 6,
 wherein the D2D transmission is monitored by monitoring a discovery message.

9. The D2D UE of claim 8,
 wherein the Rx chain is at least available for intra-frequency discovery.

10. The D2D UE of claim 6,
 wherein a reception gap for D2D discovery is not configured by the base station.

11. A method for device-to-device (D2D) communication by a base station, the method comprising:
 receiving, from a D2D user equipment (UE), an indication of interest to D2D monitoring of the D2D UE;
 generating a discontinuous reception (DRX) configuration; and
 transmitting, to the D2D UE, the generated discontinuous reception (DRX) configuration,
 wherein D2D transmission from another UE is monitored by the D2D UE based on the generated DRX configuration, and
 wherein the D2D transmission is monitored by using a DRX cycle or a receiver (Rx) chain.

12. The method of claim 11,
 wherein the D2D transmission is monitored using a resource obtained based on the generated DRX configuration.

13. The method of claim 11,
 wherein the D2D transmission is monitored by monitoring a discovery message.

14. The method of claim 13,
 wherein the Rx chain is at least available for intra-frequency discovery.

15. The method of claim 11,
 wherein a reception gap for D2D discovery is not configured by the base station.

16. A base station comprising:
 a transceiver; and
 a processor configured to:
  control the transceiver to receive, from a device-to-device (D2D) user equipment (UE), an indication of interest D2D monitoring of the D2D UE,
  generate a discontinuous reception (DRX) configuration, and
  control the transceiver to transmit, to the D2D UE, the generated discontinuous reception (DRX) configuration,
 wherein D2D transmission from another UE is monitored by the D2D UE based on the generated DRX configuration, and
 wherein the D2D transmission is monitored by using a DRX cycle or a receiver (Rx) chain.

17. The base station of claim 16,
 wherein the D2D transmission is monitored using a resource obtained based on the generated DRX configuration.

18. The base station of claim 16,
 wherein the D2D transmission is monitored by monitoring a discovery message.

19. The base station of claim 18,
 wherein the Rx chain is at least available for intra-frequency discovery.

20. The base station of claim 16,
 wherein a reception gap for D2D discovery is not configured by the base station.

* * * * *